United States Patent Office 2,815,388
Patented Dec. 3, 1957

2,815,388

PREPARATION OF AN UNSATURATED $C_{40}$ DIOL

Hans Herloff Inhoffen, Braunschweig, Germany, and Otto Isler, Marc Montavon, and Rudolf Rüegg, Basel, and Paul Zeller, Neuallschwil, Switzerland, assignors to Hoffmann-La Roche Inc., Nutley, N. J., a corporation of New Jersey No Drawing. Application March 7, 1955,
Serial No. 492,748

Claims priority, application Switzerland March 12, 1954

10 Claims. (Cl. 260—617)

This invention relates to an improvement in the preparation of an unsaturated $C_{40}$ diol, viz. 1,18-di-(2,6,6-trimethyl-1-cyclohexen-1-yl)-3,7,12,16-tetramethyl-2,4,6,12,14,16-octadecahexaen-9-yne-8,11-diol. This diol is an intermediate in a known synthesis of β-carotene, the latter of course being a compound of known utility. An important object of the invention is an improvement in the synthesis of β-carotene, more particularly in the preparation of the unsaturated $C_{40}$ diol intermediate by a process which is economical and readily adaptable to practice on a commercial scale.

Briefly, the invention relates to a process for preparing 1,18 - di - (2,6,6 - trimethyl-1-cyclohexen-1-yl)-3,7,12,16-tetramethyl - 2,4,6,12,14,16 - octadecahexaen - 9-yne-8,11-diol which comprises condensing the known compound 8-(2,6,6 - trimethyl-1-cyclohexen-1-yl)-2,6-dimethyl-2,4,6-octatrien-1-al in liquid ammonia with an alkali metal acetylide or an alkaline earth metal acetylide, and further condensing the condensation product formed (preferably after hydrolysis of the latter to 10-(2,6,6-trimethyl-1-cyclohexen - 1-yl)-4,8-dimethyl-4,6,8-decatrien-1-yn-3-ol) with 8 -(2,6,6-trimethyl-1-cyclohexen-1-yl)-2,6-dimethyl-2,4,6-octatrien-1-al by means of a metal-organic reaction.

In one comprehensive embodiment, the invention provides a process of making 1,18-di-(2,6,6-trimethyl-1-cyclohexen - 1-yl)-3,7,12,16-tetramethyl-2,4,6,12,14,16-octadecahexaen-9-yne-8,11-diol which comprises the steps of condensing 8 - (2,6,6 - trimethyl - 1-cyclohexen-1-yl)-2,6-dimethyl-2,4,6-octatrien-1-al with a compound selected from the group consisting of alkali metal acetylides and alkaline earth metal acetylides, hydrolyzing the condensation product thereby producing 10-(2,6,6-trimethyl-1-cyclohexen - 1 - yl)-4,8-dimethyl-4,6,8-decatrien-1-yn-3-ol, reacting the latter with an organometal compound selected from the group consisting of hydrocarbon-magnesium-halide and hydrocarbon-alkali metal compounds, condensing the di-metal compound obtained with 8-(2,6,6-trimethyl - 1 - cyclohexen-1-yl)-2,6-dimethyl-2,4,6-octatrien-1-al, and hydrolyzing the condensation product thereby producing 1,18 - di - (2,6,6-trimethyl-1-cyclohexen-1-yl) - 3,7,12,16 - tetramethyl - 2,4,6,12,14,16-octadecahexaen-9-yne-8,11-diol.

The first stage of the comprehensive embodiment referred to above comprises condensing 8-(2,6,6-trimethyl-1 - cyclohexen - 1-yl)-2,6-dimethyl-2,4,6-octatrien-1-al in liquid ammonia with an alkali metal acetylide, e. g. sodium acetylide or lithium acetylide, or with an alkaline earth metal acetylide, e. g. calcium acetylide. The condensation can be effected in liquid ammonia either at room temperature under superatmospheric pressure or at the boiling temperature of the ammonia under normal pressure. The acetylide can be prepared from an alkali metal or an alkaline earth metal and acetylene before the condensation reaction, advantageously in the same vessel and using the same liquid ammonia medium as is to be employed for the condensation. Preferably, lithium acetylide is densation product can be represented by the formula (I) 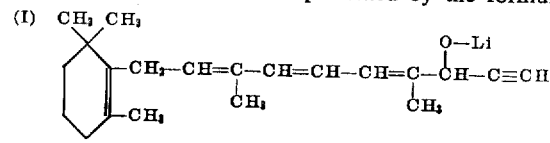

The 8 - (2,6,6-trimethyl-1-cyclohexen-1-yl)-2,6-dimethyl-2,4,6-octatrien-1-al can be added as a solution thereof in an inert solvent, as for example diethyl ether. When approximately equimolar proportions of 8-(2,6,6-trimethyl - 1-cyclohexen-1-yl)-2,6-dimethyl-2,4,6-octatrien-1-al and lithium acetylide are employed in the condensation, the yield is almost quantitative. An excess of the acetylide, however, does not influence the reaction unfavorably. Side reactions are substantially absent.

In a second stage of the comprehensive embodiment referred to above, the condensation product obtained in the above described first stage is hydrolyzed, thereby yielding 10-(2,6,6-trimethyl - 1 - cyclohexen-1-yl)-4,8-dimethyl-4,6,8-decatrien-1-yn-3-ol. The hydrolysis can be effected by methods known per se, for example by removing the ammonia from the reaction mixture containing the condensation product and treating the residue with a dilute aqueous solution of a mineral acid. A preferred mode of execution comprises treating the condensation product of the first stage, while still dissolved in liquid ammonia, with an ammonium salt, e. g. ammonium chloride.

The third stage of the comprehensive embodiment referred to above comprises the condensation of the carbinol 10-(2,6,6-trimethyl-1-cyclohexen-1-yl)-4,8-dimethyl-4,6,8-decatrien-1-yn-3-ol with an organometal compound, e. g. a hydrocarbon-magnesium-halide or a hydrocarbon-alkali metal compound, preferably a lower alkyl-magnesium-bromide or -chloride, or a lithium-aryl such as lithium-phenyl. It is advantageous to perform this condensation in an organic solvent, for example a di-lower alkyl ether such as diethyl ether. Approximately two mols of the organometal compound are employed for each mol of carbinol. The first mol of the metal compound reacts with the hydroxyl group in the carbinol, whereas the second mol substitutes the hydrogen of the acetylenic linkage and renders the terminal carbon atom of the carbinol reactive in the succeeding condensation reaction of the fourth stage, described below. The dimagnesium-halide or di-alkali metal compound thus obtained as the condensation product can be represented by the formula (II) 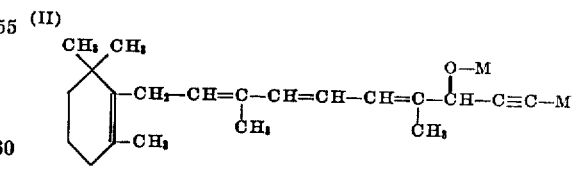

wherein M represents a monovalent radical selected from the group consisting of -Mg-halide and alkali metal.

In the fourth stage of the comprehensive process, said condensation product II is reacted (advantageously in the same organic solvent in which it was prepared) with 8-(2,6,6-trimethyl-1-cyclohexen-1-yl)-2,6 - dimethyl-2,4,6-octatrien-1-al. For purposes of further reaction it is unnecessary (indeed, it is preferred not) to isolate or purify the further condensation product obtained, which latter can be represented by the formula (III)

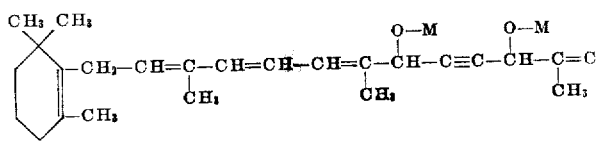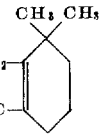

wherein M has the same meaning as in Formula II above.

The final stage in the comprehensive embodiment referred to above comprises hydrolyzing said condensation product III. As indicated, this operation is preferably carried out directly upon formation of product III, by methods known per se, for example by pouring the solution containing said condensation product onto a mixture of ice and dilute aqueous sulfuric acid. In the case of a Grignard reaction, i. e. when M represents -Mg-halide, the yield of $C_{40}$-diol obtained is practically quantitative.

In a further embodiment of the invention, different from that described above, approximately one molar proportion of an alkali metal amide, e. g. sodamide or lithium amide, is added to a suspension in liquid ammonia of the condensation product I obtained by condensing 8-(2,6,6-trimethyl - 1 - cyclohexen-1-yl)-2,6-dimethyl - 2,4,6-octatrien-1-al with lithium acetylide, and thereupon an additional molar proportion of 8-(2,6,6-trimethyl-1-cyclohexen - 1 - yl) - 2,6 - dimethyl - 2,4,6 - octatrien - 1 - al is added to the liquid ammonia containing the condensation product (Formula II above, wherein each M represents an alkali metal). Upon hydrolysis of the resulting $C_{40}$ condensation product (Formula III above, wherein each M represents an alkali metal), 1,18-di-(2,6,6-trimethyl-1-cyclohexen - 1 - yl) - 3,7,12,16 - tetramethyl - 2,4,6,12,14, 16-octadecahexaen-9-yne-8,11-diol is obtained directly.

A preferred mode of practicing the invention comprises condensing 8-(2,6,6-trimethyl-1-cyclohexen-1-yl)-2,6-dimethyl-2,4,6-octatrien-1-al in liquid ammonia with an approximately equimolar proportion of lithium acetylide, treating the condensation product in liquid ammonia with an ammonium salt, removing the ammonia from the 10-(2,6,6 - trimethyl - 1 - cyclohexen - 1 - yl) - 4,8 - dimethyl-4,6,8-decatrien-1-yn-3-ol formed, reacting the latter in a di-lower alkyl ether (preferably diethyl ether) with approximately two molar proportions of a lower alkyl magnesium halide (preferably ethyl magnesium bromide), condensing the dimagnesium-halide compound obtained with 8 - (2,6,6 - trimethyl - 1 - cyclohexen - 1 - yl) - 2,6-dimethyl-2,4,6-octatrien-1-al, and hydrolyzing the condensation product thereby producing 1,18-di-(2,6,6-trimethyl - 1 - cyclohexen - 1 - yl) - 3,7,12,16 - tetramethyl-2,4,6,12,14,16-octadecahexaen-9-yne-8,11-diol.

The invention is further disclosed in the following example, which is illustrative but not limitative thereof:

*Example*

Dry, acetone-free acetylene was introduced into a solution of 1.7 g. of lithium in 600 cc. of liquid ammonia until the color disappeared, and for an additional period of 30 minutes thereafter to complete the reaction. Then, over a period of 15 minutes and while stirring vigorously, a solution of 59 g. of 8-(2,6,6-trimethyl-1-cyclohexen-1-yl)-2,6-dimethyl-2,4,6-octatrien-1-al in 200 cc. of absolute diethyl ether was added. The reaction mixture was stirred thoroughly for 20 hours while excluding moisture. At the end of this time 20 g. of ammonium chloride was added portionwise and then the ammonia was evaporated off. 200 cc. of water was added, the ether layer was separated, washed with water, dried over sodium sulfate and concentrated. The residual light yellow oil was thoroughly dried in vacuo. There was obtained 64.2 g. of 10 - (2,6,6 - trimethyl - 1 - cyclohexen - 1 - yl) - 4,8 - dimethyl - 4,6,8 - decatrien - 1 - yn - 3 - ol, $n_D^{23}=1.576$; U. V. max. 280–1 m$\mu$, $E_1^1=1630$ in petroleum ether. The yield was practically quantitative. A Zerewitinoff determination showed 1 atom of active hydrogen in the cold and 2 atoms when warm.

To a Grignard solution prepared from 11.5 g. of magnesium chips, 37 cc. of ethyl bromide and 100 cc. of absolute diethyl ether was added slowly at 15–20° C., while stirring and cooling, a solution of 64.2 g. of 10-(2,6,6-trimethyl - 1 - cyclohexen - 1 - yl) - 4,6,8 - decatrien - 1 - yn-3-ol in 200 cc. of absolute diethyl ether. The reaction mixture was refluxed for one hour in a nitrogen atmosphere and was then cooled down with ice water. A solution of 58.9 g. of 8-(2,6,6-trimethyl-1-cyclohexen-1-yl)-2,6-dimethyl-2,4,6-octatrien-1-al in 300 cc. of absolute diethyl ether was added at about 20° C., and then the reaction mixture was refluxed for about 4 hours in a nitrogen atmosphere. The reaction mixture was then poured onto a mixture of 200 cc. of 3N aqueous sulfuric acid and 300 g. of ice, the whole was diluted with 3000 cc. of diethyl ether and shaken well for a few minutes. The ether layer was separated, washed with 5 percent aqueous sodium bicarbonate solution, dried over sodium sulfate and concentrated in vacuo at about 40° C. There was thus obtained 123 g. of 1,18-di-(2,6,6-trimethyl-1-cyclohexen-1-yl) - 3,7,12,16 - tetramethyl - 2,4,6,12,14,16 - octadecahexaen - 9 - yne - 8,11 - diol as a crystalline residue. U. V. max., 280–1 m$\mu$, $\epsilon = 87000$ in petroleum ether; active hydrogen: 2.0 (cold). Yield: almost quantitative. The product can be recrystallized from petroleum ether, if desired.

We claim:

1. A process which comprises condensing 8-(2,6,6-trimethyl - 1 - cyclohexen - 1 - yl) - 2,6 - dimethyl - 2,4,6-octatrien - 1 - al with a compound selected from the group consisting of alkali metal acetylides and alkaline earth metal acetylides, hydrolyzing the condensation product thereby producing 10 - (2,6,6 - trimethyl - 1 - cyclohexen-1 - yl) - 4,8 - dimethyl - 4,6,8 - decatrien - 1 - yn - 3 - ol, reacting the latter with an organometal compound selected from the group consisting of hydrocarbon-magnesium-halide and hydrocarbon-alkali metal compounds, condensing the di-metal compound obtained with 8-(2,6,6-trimethyl - 1 - cyclohexen - 1 - yl) - 2,6 - dimethyl - 2,4,6-octatrien - 1 - al, and hydrolyzing the condensation product thereby producing 1,18 - di - (2,6,6 - trimethyl - 1-cyclohexen - 1 - yl) - 3,7,12,16 - tetramethyl - 2,4,6,12,14, 16-octadecahexaen-9-yne-8,11-diol.

2. A process which comprises condensing 8-(2,6,6-trimethyl - 1 - cyclohexen - 1 - yl) - 2,6 - dimethyl - 2,4,6-octatrien-1-al in liquid ammonia with a compound selected from the group consisting of alkali metal acetylides and alkaline earth metal acetylides and hydrolyzing the condensation product thereby producing 10-(2,6,6-trimethyl - 1 - cyclohexen - 1 - yl) - 4,8 - dimethyl - 4,6,8-decatrien-1-yn-3-ol.

3. 10 - (2,6,6 - trimethyl - 1 - cyclohexen - 1 - yl) - 4,8-dimethyl-4,6,8-decatrien-1-yn-3-ol.

4. The compound

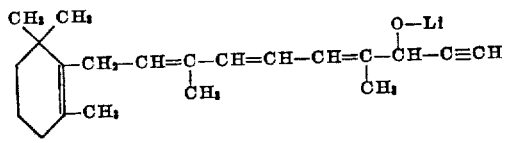

5. A process which comprises condensing 8-(2,6,6-trimethyl - 1 - cyclohexen - 1 - yl) - 2,6 - dimethyl - 2,4,6- octatrien-1-al with lithium acetylide in liquid ammonia, thereby producing a compound according to claim 4.

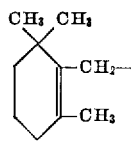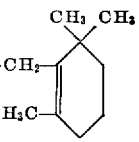

dimethyl-2,4,6-octatrien-1-al in an organic solvent, thereby producing a compound having the formula halide-Mg—O     O—Mg-halide —CH₂—CH=C—CH=CH—CH=C—CH—C≡C—CH—C=CH—CH=CH—C=CH—CH₂—
            CH₃           CH₃       CH₃        CH₃

6. A compound having the formula

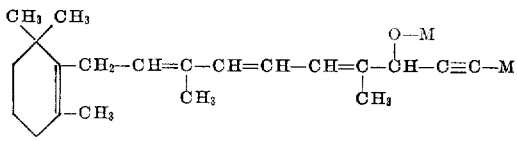

wherein M represents a member selected from the group consisting of —Mg—halide and alkali metal.

7. A process which comprises condensing 10-(2,6,6,-trimethyl - 1 - cyclohexen - 1 - yl) - 4,8 - dimethyl - 4,6,8 - decatrien-1-yn-3-ol with an organometal compound selected from the group consisting of hydrocarbon-magnesium-halide and hydrocarbon-alkali metal compounds, thereby producing a compound according to claim 6.

8. A process which comprises condensing a compound having the formula

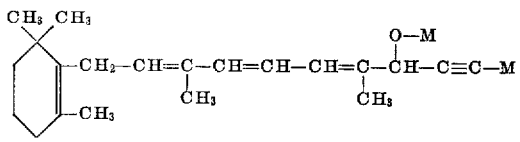

wherein M represents a member selected from the group consisting of —Mg—halide and alkali metal, with 8-(2,6,6-trimethyl - 1 - cyclohexen - 1 - yl) - 2,6 - dimethyl - 2,4,6 - octatrien-1-al, and hydrolyzing, thereby producing 1,18-di - (2,6,6 - trimethyl - 1 - cyclohexen - 1 - yl) - 3,7,12,16 - tetramethyl - 2,4,6,12,14,16 - octadecahexaen - 9 - yne - 8,11-diol.

9. A process which comprises condensing a compound having the formula

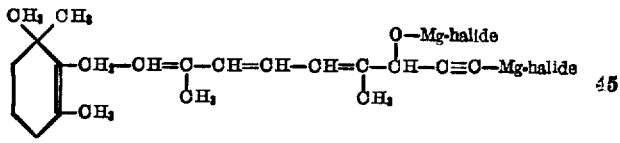

with 8 - (2,6,6 - trimethyl - 1 - cyclohexen - 1 - yl) - 2,6 -

10. A process which comprises condensing 8 - (2,6,6 - trimethyl - 1 - cyclohexen - 1 - yl) - 2,6 - dimethyl -2,4,6 - octatrien-1-al in liquid ammonia with an approximately equimolar proportion of lithium acetylide, treating the condensation product in liquid ammonia with an ammonium salt, removing the ammonia from the 10-(2,6,6-trimethyl - 1 - cyclohexen - 1 - yl) - 4,8 - dimethyl - 4,6,8 - decatrien-1yn-3-ol formed, reacting the latter in an organic solvent with approximately two molar proportions of a lower alkyl magnesium halide, condensing the di-magnesium-halide compound obtained with 8-(2,6,6-trimethyl-1-cyclohexen-1-yl)-2,6-dimethyl-2,4,6-octatrien-1-al, and hydrolyzing the condensation product thereby producing 1,18 - di - (2,6,6 - trimethyl - 1 - cyclohexen - 1 - yl) - 3,7,12,16 - tetramethyl - 2,4,6,12,14,16 - octadecahexaen - 9-yne-8,11-diol.

References Cited in the file of this patent
UNITED STATES PATENTS

| | | |
|---|---|---|
| 2,369,164 | Milas | Feb. 13, 1945 |
| 2,671,112 | Inhoffen et al. | Mar. 2, 1954 |
| 2,674,621 | Oroshnik | Apr. 6, 1954 |

OTHER REFERENCES

Tome: "Synthesis and Allylic Rearrangement of 1-(2-Methylcyclohexene - 1 - yl) - 3 - Methylpent - 4 - En - 1 - Yn-3-Ol." Thesis at Mass. Inst. Tech., May 23, 1947 (28 pp.).

Karrer et al.: Helv. Chim. Acta., vol. 34 (1951), pp. 28–33 (6 pp.).

UNITED STATES PATENT OFFICE

CERTIFICATE OF CORRECTION

Patent No. 2,815,388                      December 3, 1957

Hans Herloff Inhoffen et al.

It is hereby certified that error appears in the printed specification of the above numbered patent requiring correction and that the said Letters Patent should read as corrected below.

Column 2, line 3, after "is" insert --employed for the condensation, in which case the con- --; column 6, line 16, for "-lyn-" read -- -1-yn- --.

Signed and sealed this 4th day of February 1958.

(SEAL)
Attest:
KARL H. AXLINE

Attesting Officer

ROBERT C. WATSON
Commissioner of Patents